United States Patent [19]
Courtot

[11] 3,814,138
[45] June 4, 1974

[54] HOSE CONSTRUCTION
[75] Inventor: Louis B. Courtot, Euclid, Ohio
[73] Assignee: The Weatherhead Company, Cleveland, Ohio
[22] Filed: Oct. 18, 1972
[21] Appl. No.: 298,566

[52] U.S. Cl.................. 138/124, 138/132, 138/137
[51] Int. Cl............................................ F16l 11/08
[58] Field of Search............ 138/118, 121, 123–127, 138/129, 130, 132, 137, 138

[56] References Cited
UNITED STATES PATENTS

| 746,319 | 12/1903 | Frees................................ 138/124 |
| 2,624,366 | 1/1953 | Pugh................................. 138/137 X |
| 3,242,691 | 3/1966 | Robinson et al.................. 138/138 X |
| 3,460,578 | 8/1969 | Schmid............................. 138/125 |
| 3,599,677 | 8/1971 | O'Brien............................ 138/137 X |

*Primary Examiner*—Charles A. Ruehl
*Attorney, Agent, or Firm*—McNenny, Farrington, Pearne & Gordon

[57] ABSTRACT

A reinforced plastic hose is disclosed which includes an inner core, a braid, and a protective cover. The inner core is provided with a plurality of rounded ridges and valleys extending longitudinally along the outer peripheral surface thereof. The braid is disposed on the ridges and is tensioned so that the ridges hold the braid radially spaced from the valleys. When the protective cover is extruded over the inner core and braid, it flows into the space between the valleys and the braid so that the braid is encapsulated about its entire peripheral extent by the protective cover at the locations of the valleys to lock the braid against movement relative to the protective cover. The tension in the braid is insufficient to radially inwardly deflect the rounded surface of the ridges and embed the braid in the ridges, so that the braid and protective cover can move together longitudinally along the inner core when the hose is deflected. Relative rotational movement between the protective cover and the braid is prevented by the spline-like engagement of the protective cover and inner core.

7 Claims, 6 Drawing Figures

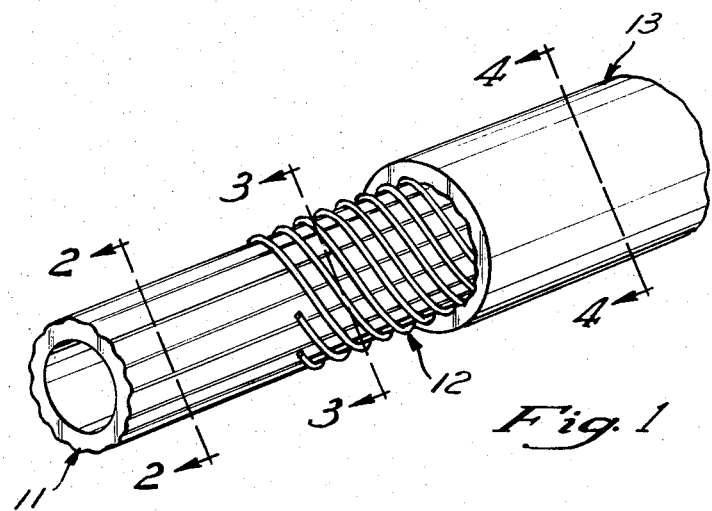
Fig. 1
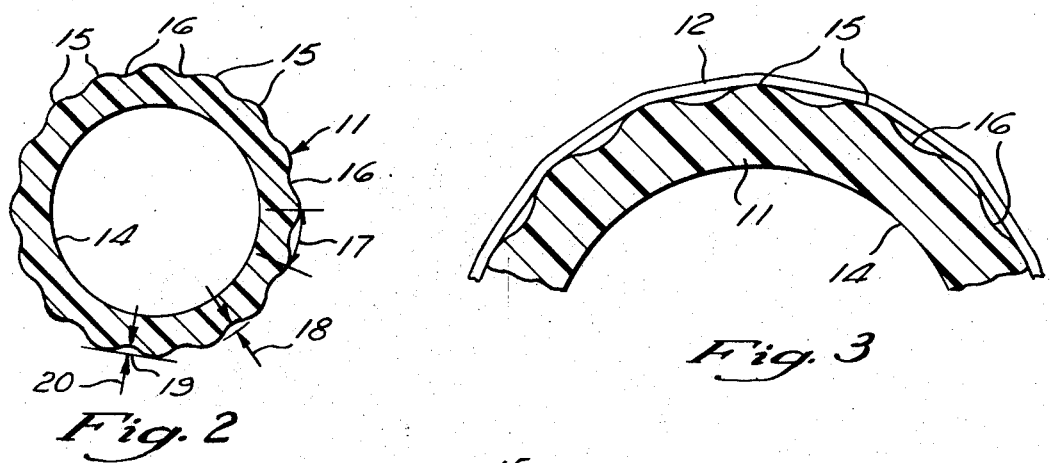
Fig. 2
Fig. 3
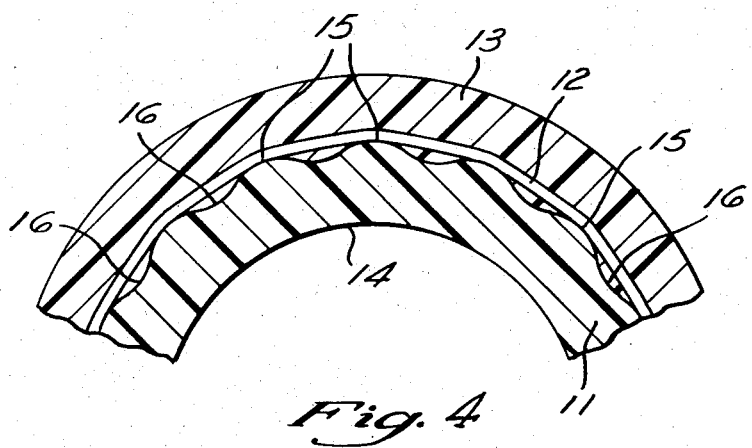
Fig. 4

3,814,138

HOSE CONSTRUCTION

BACKGROUND OF THE INVENTION

Reinforced flexible and semi-flexible plastic hose is used for a wide variety of purposes, including motor vehicle air brake systems.

Such reinforced hose includes an inner core, a braid applied over the inner core, and a protective cover which is bonded to the inner core. This bonded construction, in a manner known to the art, produces a hose with strength characteristics which are superior to such characteristics of single wall tubing of equal wall thickness. However, such bonded construction may adversely affect the flexibility characteristics of the reinforced hose.

When such reinforced hose is used in applications where it is subjected to repeated bending, such as in motor vehicle air brake systems, such bending may cause kinking (i.e., radially inward collapse of the hose) at a relatively large radius of curvature of the bended hose because of lack of relative movement between the inner core, the braid, and the protective cover. This lack of relative movement in such bonded construction also results in detrimental unequal stress distribution in the filaments of the braid.

As used herein, the term "braid" includes reinforcing strands, whether of plastic, natural thread, wire, or other suitable material, which are arranged in any desired configuration, including for example spiral wrapping of a single strand spiral, a double strand spiral, or an interwoven multiple strand spiral. The term "closed braid" includes braids in which adjacent filaments or strands extending in the same direction are substantially contiguous, and the term "open braid" includes braids in which adjacent filaments or strands extending in the same direction or opposite direction are spaced from one another.

SUMMARY OF THE INVENTION

The present invention provides a reinforced hose in which the braid is locked in position at the interface of the inner core and the protective cover, via encapsulation by the protective cover and without bonding of the protective cover to the inner core, to prevent unequal stress distribution in the braid while retaining the desirable flexibility characteristics of the hose.

The present invention accomplishes this by providing a plurality of rounded ridges and valleys extending longitudinally along the outer peripheral surface of the inner core. An open braid is disposed on the rounded surface of the ridges and is tensioned so that the ridges hold the braid radially spaced from the valleys. The protective cover is then extruded over the braid and the inner core. Because the open braid is spaced from the inner core at the locations of the valleys, the material from which the protective cover is extruded flows through the openings between the strands of the braid into the valleys and encapsulates the braid about its entire peripheral extent at the location of the valleys. This locks the braid and the protective cover against rotational movement at the interface of the inner core and the protective cover and prevents abrading or unequal stress distribution in the strands of the braid, but permits limited relative longitudinal movement between the inner core and the protective cover.

Because the ridges are rounded, the area of surface contact between the braid and the inner core is minimized, and the tension in the braid is insufficient to radially inwardly deflect the ridges and embed the braid in the ridges. Because the ridges and valleys extend in the longitudinal direction, and because the braid is not embedded in the ridges of the inner core, the braid and the protective cover move together longitudinally along the inner core when the hose is deflected, so that the hose according to the present invention has better flexibility characteristics than reinforced hoses in which the protective cover is bonded to the inner core to encapsulate the braid.

BRIEF DESCRIPTION OF THE DRAWINGS

These and other aspects and advantages of the invention will become apparent to those skilled in the art upon a comprehensive understanding of a first embodiment and two alternate embodiments of the invention shown in the accompanying drawings, wherein:

FIG. 1 is a perspective view of a reinforced hose according to a first embodiment of the invention, with portions cut away for clarity;

FIG. 2 is a cross-sectional view taken along reference view line 2—2 of FIG. 1;

FIG. 3 is a cross-sectional view taken along reference view line 3—3 of FIG. 1;

FIG. 4 is a cross-sectional view taken along reference view line 4—4 of FIG. 1;

DETAILED DESCRIPTION OF THE DRAWINGS

Figure 5:
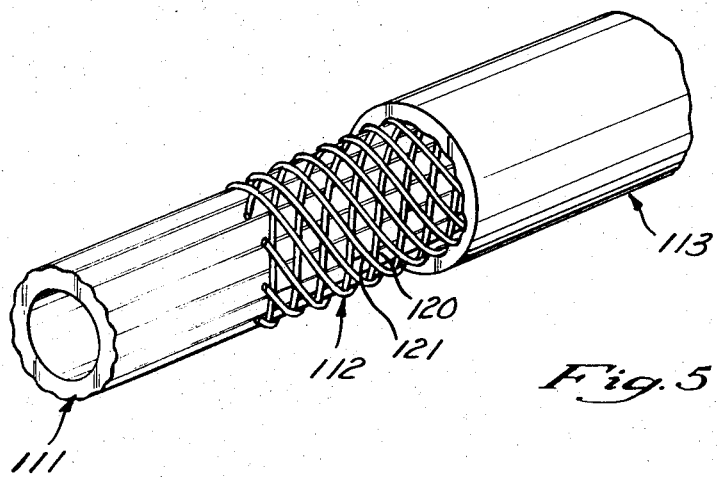
FIG. 5 is a perspective view of a portion of a reinforced hose according to an alternate embodiment of the invention, with portions cut away for clarity.

Referring now to the drawings in greater detail, FIG. 1 shows a reinforced hose according to a first embodiment of the invention which includes an inner core 11, a braid 12 and a protective cover 13. Although the reinforced hose shown in FIG. 1 may be used for a wide variety of purposes, it is particularly well suited for use in motor vehicle air brake systems.

The inner core 11 of the reinforced hose, in the first embodiment, is a single wall extrusion of nylon or similar material. As shown in FIG. 2, the inner core 11 has a cylindrical inner peripheral wall 14 and an outer peripheral wall which includes a plurality of longitudinally extending ridges 15 which are interspaced by longitudinally extending valleys 16. Both the ridges 15 and the valleys 16 are of rounded or arcuate cross section, as described in detail below. Although the ridges 15 and valleys 16 of the first embodiment extend solely in the longitudinal direction, such ridges and valleys could, alternatively, extend in both the longitudinal direction and the circumferential direction to form a spiral pattern about the outer peripheral surface of the inner core 11.

The ridges 15 are equally spaced circumferentially about the outer peripheral surface of the inner core 11. As further shown in FIG. 2, the circumferential distance 17 between the top of adjacent ridges 15 and the radial distance 18 between the top of each ridge 15 and the bottom of each valley 16 are dimensioned so that a straight line 19 drawn between adjacent ridges 15 is spaced from the bottom of each valley 16 by a radial distance 20 which is at least as great as one-half the thickness of the strands of the braid 12. In a manner fully described below, this insures full encapsulation of the strands of the braid 12 by the material of the protective cover 13 at the locations of the valleys 16.

The braid 12 in the first embodiment of the invention shown in FIGS. 1–4 is a single strand spiral of polyester or similar material. Alternatively, the braid 12 could be of metal wire or natural thread or other suitable single or multiple filament material. The braid 12 is an open braid and is disposed on the outer peripheral surface of the inner core 11 in the manner shown in FIG. 3. The strands of the braid 12 are tensioned tight enough that such strands extend across the ridges 15 without sagging into the valleys 16, but, because the ridges 15 are of arcuate cross section, such tension is insufficient to radially inwardly deflect the surface of the ridges 15 and embed the braid 12 in the surface of the ridges 15.

After the braid 12 has been placed on the inner core 11 in this manner, the protective cover 13 is extruded over the inner core 11 and braid 12. In the first embodiment, the protective cover 13 is of nylon which may contain additives which provide ultraviolet light resistance. As seen in FIG. 4, the material of the protective cover 13 flows into the valleys 16 of the inner core 11 throughout the longitudinal extent of the valleys 16. In this manner, and because as described above the distance 20 is at least as great as one-half the thickness of the strands of the braid 12, the protective cover 13 totally encapsulates the strands of the braid 12 at the locations of the valleys 16. This positively locks the braid 12 against rotational movement to minimize abrading and unequal stress distribution that could otherwise be caused by such movement of the braid 12.

Because the braid 12 is not embedded in the ridges 15 of the inner core 11, and because the longitudinally extending valleys 16 are of arcuate cross section so that such valleys do not bind the protective cover 13 or otherwise impair longitudinal movement of the protective cover 13 relative to the inner core 11, the protective cover 13 and encapsulated braid 15 can move longitudinally relative to the inner core 11 when the hose is bent so that the flexibility of the reinforced hose according to this construction is greater than the flexibility of reinforced hoses in which the protective cover is bonded to the inner core. Furthermore, because the ridges 15 are rounded, the area of the surface contact between the braid 12 and the ridges 15 is minimized so that such longitudinal movement between the braid 15 and the inner core 11 will not cause the braid 12 to abrade the inner core 11.

Although the first embodiment shown in FIGS. 1–4 has been described above with particular reference to problems of the inner core 11 and the protective cover 13 being abraded by the braid 12 because the braid 12 is of the greater hardness in the first embodiment, the invention will also protect abrading of the braid 12 by the inner core 11 and/or the protective cover 13 when the braid 12 is of lesser hardness than the inner core 11 and/or the protective cover 13.

An alternate embodiment of the invention is shown in FIG. 5. The reinforced hose shown in FIG. 5 includes an inner core 111, a braid 112, and a protective cover 113. The inner core 111 is substantially the same as the inner core 11 of the first embodiment shown in FIGS. 1–4, and the protective cover 113 is substantially the same as the protective cover 13 of the first embodiment shown in FIGS. 1–4. The braid 112, however, differs from the single strand spiral of the first embodiment and is an open braid double strand spiral in which a first or bottom strand 120 is wound in a helix in one direction and a second or top strand 121 is wound over the strand 120 in a helix in an opposite direction. The bottom strand 120 is tensioned tight enough that it extends across the ridges of the outer peripheral surface of the inner core 111 without sagging into the valleys thereof, but, as described in detail above with particular reference to the first embodiment, such tension is insufficient to embed the strand 120 in the surface of such ridges. The top strand 121 is also tensioned so that it does not sag into the valleys of the inner core 111, and the tension of the top strand 121 is insufficient to push the bottom strand 120 into the surface of the ridges of the inner core.

In this alternate embodiment, the bottom strand 120 is encapsulated by the protective cover 113 at the locations of the valleys in the outer peripheral surface of the inner core 111 in the manner described above with reference to the single strand of the braid 12 of the first embodiment. The top strand 121, which is wound over the bottom strand 120 and therefore spaced from the outer peripheral surface of the inner core 111, is fully encapsulated within the protective cover 113 along substantially its entire longitudinal extent. The inner core 111, braid 112 and protective cover 113 function in substantially the same manner as described in detail above with particular reference to the first embodiment shown in FIGS. 1–4.

Figure 6:
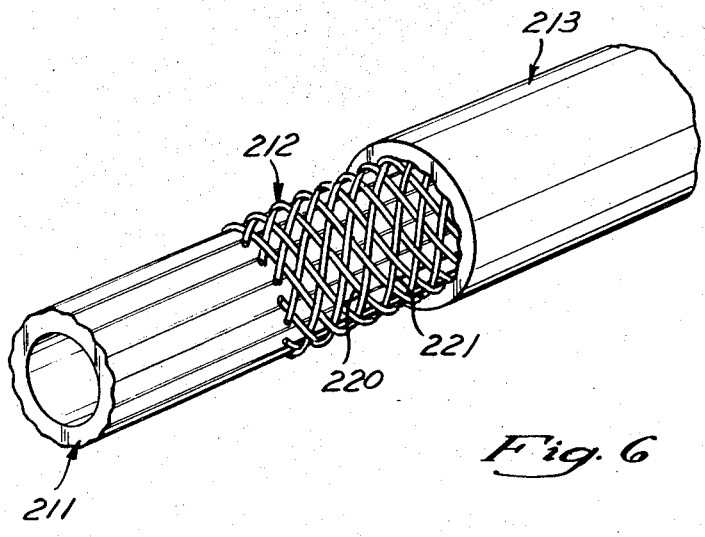
FIG. 6 is a perspective view of a portion of a reinforced hose according to another alternate embodiment of the invention, with portions cut away for clarity.

Another alternate embodiment of the invention is shown in FIG. 6. The reinforced hose shown in FIG. 6 includes an inner core 211, a braid 212, and a protective cover 213. The inner core 211 is substantially the same as the inner core 11 of the first embodiment shown in FIG. 1, and the protective cover 213 is substantially the same as the protective cover 13 of the first embodiment shown in FIG. 1. The braid 212, however, differs from the single strand spiral of the first embodiment and is a woven or braided double strand spiral in which a first strand 200 is wound in a helix in one direction and a second strand 221 is wound over and under the strand 220 in a helix in an opposite direction. The strands 220 and 221 are tensioned sufficiently tight enough that they extend across the ridges of the outer peripheral surface of the inner core 211 without sagging into the valleys thereof, but, as described in detail above with particular reference to the first embodiment, such tension is insufficient to embed either of the strands 220 and 221 in the surface of such ridges.

In this alternate embodiment, the woven strands 220 and 221 are encapsulated by the protective cover 213 at the locations of the valleys in the outer peripheral surface of the inner core 211 in the manner described above with reference to the single strand of the braid 12 of the first embodiment. The inner core 211, braid 212 and protective cover 213 function in substantially the same manner as described in detail above with particular reference to the first embodiment shown in FIGS. 1–4.

Although a first embodiment and two alternate embodiments of the invention have been shown and described in detail, various modifications and rearrangements may be made without departing from the scope of the invention as defined by the following claims.

What is claimed is:

1. A reinforced hose comprising an inner core, a braid, and a protective cover, and inner core being of generally tubular configuration and including an inner peripheral surface and an outer peripheral surface, said outer peripheral surface having a plurality of longitudinally extending ridges and valleys, said braid having at least one strand extending circumferentially about said outer peripheral surface, said braid being disposed on the surface of said ridges and being spaced from the bottom of said valleys, said braid being tensioned to bridge the valley between adjacent ridges, said tension of said braid being insufficient to radially inwardly deflect said surface of said ridges, said protective cover filling said valleys and totally encapsulating the circumferential extent of said braid at the location of each of said valleys, and said braid and said protective cover moving together longitudinally relative to said inner core when said hose is deflected from a straight longitudinal configuration to a curved longitudinal configuration.

2. A reinforced hose in accordance with claim 1 wherein said inner core and said protective cover are each of plastic.

3. A reinforced hose in accordance with claim 1 wherein the lateral cross-sectional configuration of each of said ridges is arcuate, whereby the area of surface contact between said braid and said inner core is minimized.

4. A reinforced hose in accordance with claim 1 wherein said ridges and said valleys are dimensioned so that a straight line extending between adjacent ones of said ridges is spaced from the bottom of the valley interspacing said adjacent ridges.

5. A reinforced hose in accordance with claim 4 wherein the radial distance between said straight line and said interspacing valley is at least as great as one-half the diameter of said strand.

6. A reinforced hose in accordance with claim 1 wherein said ridges and said valleys extend solely in said longitudinal direction.

7. A reinforced hose comprising a plastic inner core, a braid, and a plastic protective cover, said inner core being of generally tubular configuration and including a cylindrical inner peripheral surface and an outer peripheral surface, said outer peripheral surface having a plurality of longitudinally extending ridges and valleys, each of said ridges and each of said valleys being of arcuate lateral cross-sectional configuration, said braid having at least one strand of greater hardness than said inner core and said protective cover extending circumferentially about said outer peripheral surface, said braid being disposed on the surface of said ridges and being spaced from the bottom of said valleys, the tension of said braid being insufficient to radially inwardly deflect said surface of said ridges, said protective cover filling said valleys and totally encapsulating the circumferential extent of said braid at the location of each of said valleys, and said braid and said protective cover moving together longitudinally relative to said inner core when said hose is deflected from a straight longitudinal configuration to a curved longitudinal configuration.

* * * * *

UNITED STATES PATENT OFFICE
CERTIFICATE OF CORRECTION

Patent No. 3,814,138            Dated June 4, 1974

Inventor(s) Louis B. Courtot

It is certified that error appears in the above-identified patent and that said Letters Patent are hereby corrected as shown below:

Column 4, Line 45, "200" should be --220--.

Column 5, Line 5, second occurence, "and" should be --said--

Signed and sealed this 17th day of September 1974.

(SEAL)
Attest:

McCOY M. GIBSON JR.
Attesting Officer

C. MARSHALL DANN
Commissioner of Patents